(12) United States Patent
Reimann

(10) Patent No.: US 11,882,454 B2
(45) Date of Patent: Jan. 23, 2024

(54) DETECTION OF ATTACKS ON RADIO AUTHORIZATION SYSTEMS

(71) Applicant: LAMBDA:4 ENTWICKLUNGEN GMBH, Hamburg (DE)

(72) Inventor: Rönne Reimann, Hamburg (DE)

(73) Assignee: LAMBDA:4 ENTWICKLUNGEN GMBH, Hamburg (DE)

(*) Notice: Subject to any disclaimer, the term of this patent is extended or adjusted under 35 U.S.C. 154(b) by 299 days.

(21) Appl. No.: 17/595,313

(22) PCT Filed: May 7, 2020

(86) PCT No.: PCT/EP2020/062696
§ 371 (c)(1),
(2) Date: Nov. 13, 2021

(87) PCT Pub. No.: WO2020/229294
PCT Pub. Date: Nov. 19, 2020

(65) Prior Publication Data
US 2022/0225102 A1     Jul. 14, 2022

(30) Foreign Application Priority Data
May 13, 2019  (EP) .................................. 19174045

(51) Int. Cl.
*H04W 12/122*     (2021.01)
*H04W 12/08*      (2021.01)

(52) U.S. Cl.
CPC ......... *H04W 12/122* (2021.01); *H04W 12/08* (2013.01)

(58) Field of Classification Search
CPC ........................... H04W 12/122; H04W 12/08
See application file for complete search history.

(56) References Cited

U.S. PATENT DOCUMENTS

| | | | |
|---|---|---|---|
| 8,576,940 B2* | 11/2013 | Karabinis | H04W 12/04 375/295 |
| 9,560,073 B2* | 1/2017 | Mookiah | H04W 12/122 |
| 10,051,473 B2* | 8/2018 | Manepalli | H04W 12/08 |

(Continued)

FOREIGN PATENT DOCUMENTS

| | | |
|---|---|---|
| DE | 10027380 | 12/2001 |
| DE | 102017001092 | 8/2018 |

(Continued)

*Primary Examiner* — Viral S Lakhia
(74) *Attorney, Agent, or Firm* — Sand, Sebolt & Wernow Co., LPA

(57) ABSTRACT

A design for secure radio authorization systems in respect of a discovery of an attack on a radio authorization system, in particular for access restriction systems, for example for securing radio keys, for example for automobiles. The design can be used in simpler systems and can be combined with the numerous known solutions, such as complex enabling signals, that, from a design point of view, are not dependent on the assumption of limited computing power. This object is achieved by a design in which the focus is not on the direct prevention of an attack, but rather on a determination of whether or not a signal is an original signal of the radio authorization system, specifically with reference to the signal and not (only) with reference to the content encoded in the signal, by checking whether a metric of the spectral distribution lies within a predetermined range.

15 Claims, 1 Drawing Sheet

(56) References Cited

U.S. PATENT DOCUMENTS

| | | | |
|---|---|---|---|
| 10,142,846 B2* | 11/2018 | Eder | H04L 63/123 |
| 10,154,457 B2* | 12/2018 | Van Greunen | H04W 12/106 |
| 10,512,094 B2* | 12/2019 | Kwasnick | H04W 12/12 |
| 10,592,890 B2* | 3/2020 | Ballesteros | G06Q 20/3278 |
| 10,652,743 B2* | 5/2020 | Fitzgibbon | H04L 9/32 |
| 10,911,453 B2* | 2/2021 | Pularikkal | H04L 63/083 |
| 10,966,188 B2* | 3/2021 | Chang | H04L 67/12 |
| 11,190,352 B2* | 11/2021 | Thaler, III | G06F 21/6209 |
| 2004/0137877 A1 | 7/2004 | Crowhurst et al. | |
| 2016/0323246 A1 | 11/2016 | Zivkovic et al. | |
| 2018/0254910 A1 | 9/2018 | Dutz et al. | |
| 2019/0373615 A1* | 12/2019 | Cimpu | H04W 72/541 |
| 2020/0074442 A1* | 3/2020 | Kulkarni | G06Q 20/3276 |
| 2020/0198580 A1* | 6/2020 | Saleh | B60R 25/24 |

FOREIGN PATENT DOCUMENTS

| | | |
|---|---|---|
| WO | 2000005696 | 2/2000 |
| WO | 2000012846 | 3/2000 |

* cited by examiner

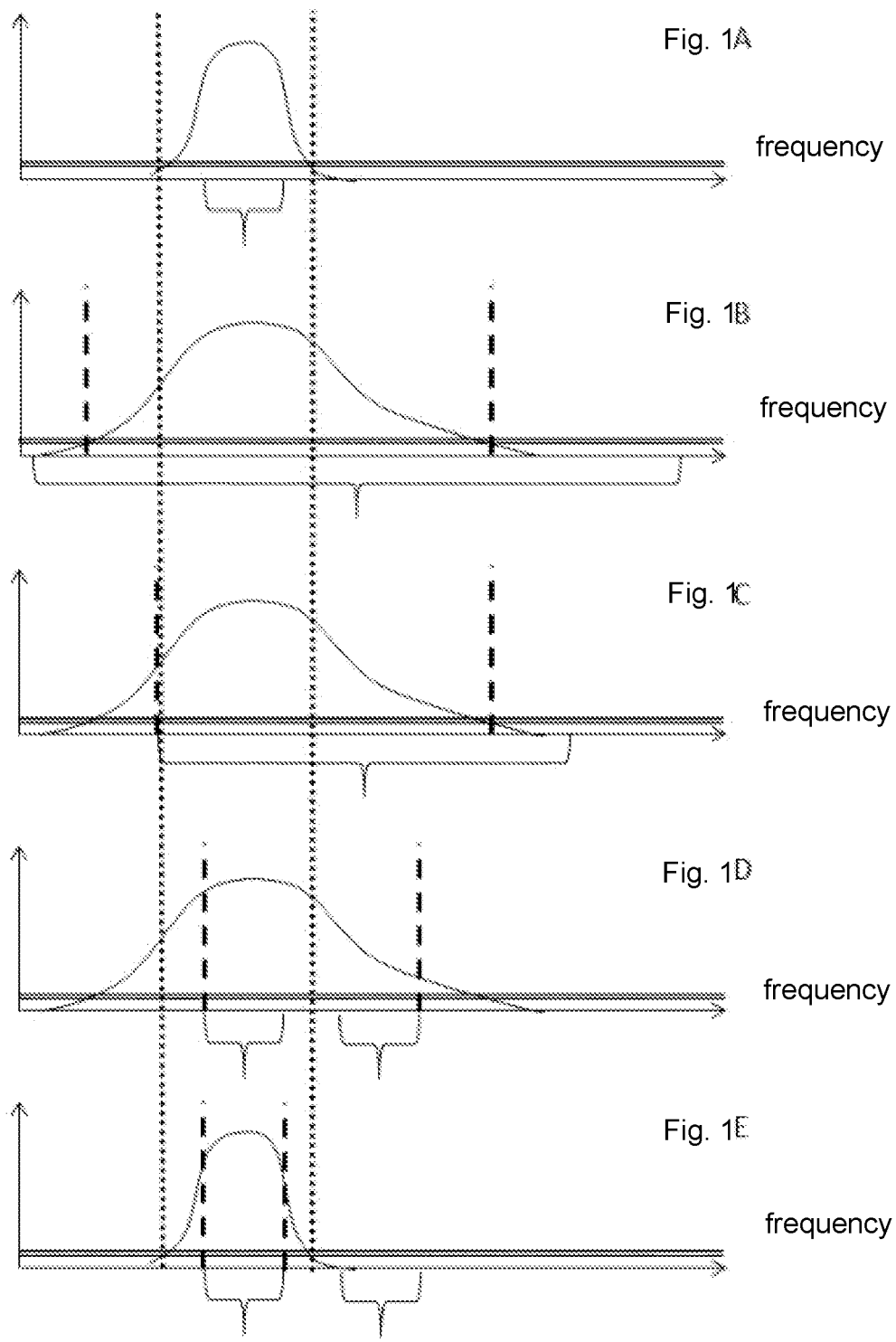

DETECTION OF ATTACKS ON RADIO AUTHORIZATION SYSTEMS

BACKGROUND

Technical Field

The invention relates to a new concept for secure radio authorization systems with regard to discerning an attack on the radio authorization system, in particular for access restriction systems, for example in order to secure remote control keys, for example for automobiles.

Background Information

In modern times, radio authorization systems and/or access restriction systems are used in various fields. For example, these days almost every automobile is equipped with a contactless access restriction system, by means of which the owner of the automobile can open and close it by means of radio authorization. Furthermore, radio authorization systems are, for example, also used to a large extent in the field of wireless network technology and related fields. By means of such radio authorization and/or access restriction systems, unauthorized access by third parties is generally intended to be prevented. As a result, significant financial equivalents, such as an automobile, or data, in particular sensitive data, are quite often intended to be protected against unauthorized access by third parties in wireless networks or the like, for example.

Radio authorization systems, access restriction devices, and/or access restriction systems can be designed, for example, to control, check and/or grant approval, for example access, in particular via an access checking means and/or by means of an access adjusting means. In this case, access in particular includes an entry, activation, deactivation, and/or opening. In particular, the access, entry, activation, deactivation and/or opening is generally only granted if authorization has been carried out successfully after an authorization attempt has been made, optionally after an authorization attempt has been repeated several times, and in particular in the event of no incorrect authorization attempts, or only a maximum of a predetermined number of incorrect authorization attempts.

Access, entry, activation, deactivation and/or opening is generally only enabled (granted) if a predefined authentication requirement is met, for example a correct password is entered or if, for example, a certificate is characterized as being valid and/or permissible in the access system and/or closes a key in a lock.

However, other authentication requirements can also be used, such as correctly answering a question or a code. Therefore, a code can be sent out by an access restriction device, which code is processed by means of an authorization means and the result can be transmitted to the access restriction means where it is checked, in particular compared with predetermined information, and the approval is made to be dependent on the outcome of the check.

An authentication requirement can contain a plurality of partial authentication requirements, such as in multifactor authentications.

In addition to entering a region, in the sense of the possible movement of an object and/or a person in this region, for example the interior of a room or of a vehicle, access can in particular also be understood to mean access to a function, in particular also in the sense of activating or releasing a function, i.e. access to the function of starting a vehicle or access to the function "dispense coffee" in a coffee machine, for example. Accordingly, access check systems are in particular not only those that only check, limit, grant and/or protect entry into a region, in the sense of the possible movement of an object and/or a person into this region, but in particular also those that check, limit, grant and/or protect access to a function, in particular also in the sense of activating or releasing a function.

In particular authorization systems, for example for logging into computer systems by means of a password and/or a certificate, for example, or classic access checking systems such as keys, cabinets, doors and/or locks and/or those for releasing functions, for example in a service station, such as coffee machines, are considered to be access checking systems. In particular, they can be doors and/or ignition locks and/or starter motors of a vehicle (for example motor vehicle, airplane, ship or autonomous taxi—and all other conceivable vehicles). Likewise, it can secure and/or release access to any service station (ATM, telephone, coffee machine—the list can be extended as desired). Mobile phones, keys, certificates, and/or input systems for entering passwords are considered to be authorization means, for example.

Granting access is often also, or only, dependent on whether the authorization means or the second object is near the first object, wherein access is in particular only granted if a predetermined distance is fallen below. The distance can also be defined by a received power/strength. Phase-based distance measurement and round trip time analyses are known means for determining the distance. All these methods can be attacked by a "Man in the Middle" or "Relay attack". The round trip time (RTT) analysis is the safest method against such an attack, and therefore this is preferably used if safety is intended to be high. In radio systems having limited bandwidths, a round trip time analysis is most easily triggered by means of a time analysis of the incoming symbols of the messages or other features in the radio signal. In particular, a round trip time analysis is often attacked "early-detect/late-commit". In particular, the invention may be used to identify these and similar attacks.

A number of possible attacks on radio-based authorization systems, access restriction devices and/or access restriction systems, in particular relay attacks by third parties on such systems, in particular on systems for limiting access to automobiles and/or motor vehicles or in the field of limiting access to radio networks, are known, such as the "Range Extender" or "Man-In-The-Middle" attack. Such an attack can be identified by a round trip time (RTT) analysis of the signal. This round trip time analysis can, for example, be carried out by measuring the exact times when the individual symbols of a message arrive. However, the attacker can attempt to manipulate this time measurement using an "early-detect/late-commit" attack, for example, so that the "Man in the middle" does not notice. In this case, an (attack) signal by such a third party is, as the invention has identified, generally more compact than an original signal in terms of time, in particular rising more steeply. This automatically results in a higher spectral width of such an (attack) signal with respect to the original signals of the radio authorization system.

Previous concepts for secure radio authorization systems are predominantly based on preventing an attack as efficiently as possible. For this purpose, the enabling signal required for access is designed to be as complex as possible so as to make an attack as difficult as possible. In this case, broadband signals or systems or systems having a plurality of different enabling signals and/or sequences thereof and/or enabling signals that are encoded in a particularly complex manner or are to be calculated are used, for example. Therefore, it is known from DE 10 027 380 A1, for example, to generate a broadband signal on the basis of a request and to check at the receiver whether the signal received corresponds to what was expected on the basis of the request. A dual-tone method or a method comprising sequences of dual tones is also known from US 2004/0 137 877 A1, WO 2000 005 696 A2 and WO 2000 012,846 A1, in which a check is carried out at the receiver to see whether the dual tones or the sequence thereof is/are received with the expected degree of purity. For this purpose, the receiver has the option of receiving the received signal using a large bandwidth or modifiable filters in order to analyze it. Third-order interference generated by a relay is therefore intended to be identified by mixing the dual tones. The known systems are accordingly complex or technically sophisticated. Correspondingly expensive system components, such as a broadband receiver or a relatively powerful processor are generally required, as a result of which these systems, methods, and/or components require a significant number of resources. In addition, with advancing technology it is usually possible to also bypass systems, which were initially considered to be secure, rather quickly in practice, since more computing power is available at a low price and in a small space than was provided when conceptualizing the systems, for example.

It is also known from DE 10 2017 001 092 A1 to pick up spectra, of the environmental spectra to be received at an automobile or at a key in each case, at said automobile or at said key, and to compare it to decipher whether the two are located in approximately the same place in order to prevent relay attacks.

SUMMARY

The problem addressed by the invention is accordingly to provide a concept for secure radio authorization systems and/or access restriction systems, which can also be used in more simple systems, and in particular can be combined with the numerous known solutions, i.e. for example complex enabling signals, and in particular the concept of which is not dependent on the assumption of limited computing power.

This object is achieved by a concept in which the direct prevention of an attack is not the focus, but finding out whether a signal is an original signal from the radio authorization system or not, specifically on the basis of the signal and not (only) on the basis of the content encoded in the signal. On the basis of this finding, a decision can be made, for example, as to whether the signal is taken into consideration and further checked or discarded of and therefore whether access is granted or denied, where necessary.

The concept according to the invention includes the use of a comparison between a metric of the spectral distribution of a received input signal and a predetermined span according to use in a radio authorization system comprising at least one first and one second object, wherein a plurality of symbols and/or chips are transmitted at a first symbol or chip rate from the first to the second object and/or from the second to the first object by means of the radio authorization system in a manner in which they are encoded in at least one first analog data signal, wherein the radio authorization system is designed to bring about an approval by means of at least one enabling signal from the second object to the first object, wherein a metric of the spectral distribution of an input signal received at the first object is compared with at least one predetermined span, wherein the predetermined span is and/or will be determined by the radio authorization system solely on the basis of data predetermined in the radio authorization system and/or on signals of the radio authorization system, and a) the input signal received is considered to be an attack and/or a signal with which the radio authorization system is unfamiliar and/or approval is denied if the metric of the spectral distribution is outside the at least one predetermined span, and/or b) is considered to be a signal of the radio authorization system and/or approval is brought about if the metric of the spectral distribution is within the at least one predetermined span, wherein the second object is designed to emit the at least one enabling signal, wherein the metric of the spectral distribution of the at least one enabling signal is within the at least one predetermined span, wherein the at least one enabling signal is and/or will be determined by means of the radio authorization system solely on the basis of data predetermined in the radio authorization system and/or on the basis of signals of the radio authorization system, and wherein the at least one enabling signal is part of the at least one first analog data signal and information is encoded in the enabling signal in a a plurality of symbols and/or chips.

The concept according to the invention further includes a corresponding method in a radio authorization system comprising at least one first and one second object, wherein a plurality of symbols and/or chips are transmitted at a first symbol or chip rate from the first to the second object and/or from the from the second to the first object by means of the radio authorization system in a manner in which they are encoded in at least one first analog data signal, wherein the radio authorization system is designed to bring about an approval by means of at least one enabling signal from the second object to the first object, wherein a metric of the spectral distribution of the input signal received at the first object is compared with at least one predetermined span, wherein the predetermined span is and/or will be determined by the radio authorization system solely on the basis of data predetermined in the radio authorization system and/or on signals of the radio authorization system, and a) the input signal received is considered to be an attack and/or a signal with which the radio authorization system is unfamiliar and/or approval is denied if the metric of the spectral distribution is outside the at least one predetermined span, and/or b) is considered to be a signal of the radio authorization system and/or an approval is brought about if the metric of the spectral distribution is within the at least one predetermined span, wherein the second object is designed to emit the at least one enabling signal, wherein the metric of the spectral distribution of the at least one enabling signal is within the at least one predetermined span, wherein the at least one enabling signal is and/or will be determined by means of the radio authorization system solely on the basis of data predetermined in the radio authorization system and/or on the basis of signals of the radio authorization system, wherein the at least one enabling signal is part of the at least one first analog data signal and information is encoded in the enabling signal in a a plurality of symbols and/or chips.

Advantageous developments of the use according to the invention or of the method according to the invention include wherein the metric of the spectral distribution of the input signal and/or enabling signal may be the overall width of the spectrum, or may be only part of the spectral width of the spectrum, in particular a sideband, the width of said sideband, an shoulder or the width of said shoulder, of the input signal and/or enabling signal, or may be provided by endpoints of the spectral distribution of the input signal and/or enabling signal. The use or method may include that the at least one predetermined span comprises the metric of the spectral distribution of the enabling signal, and/or the at least one predetermined span exceeds the metric of the spectral distribution of the enabling signal the spectral width of the enabling signal by from 1% to 50%, and/or wherein the at least one predetermined span may be exactly one predetermined span. In the use or method the metric may be characterized in that it is a spectral width, the at least one limit of which is determined by the frequency at which, based on the frequency having maximum amplitude of a signal or the carrier frequency, the amplitude of the spectrum of the signal has dropped to 5% or less of the maximum amplitude. The use or method may be characterized in that the frequency spectrum of the input signal may be spectrally resolved across at least one first frequency range, the at least one first frequency range being selected such that frequencies in the at least one first frequency range lie outside the at least one predetermined span, at least in part, in particular the at least one first frequency range have no overlap with the at least one predetermined span, in particular being at a distance of at least 5% of the signal bandwidth from the at least one predetermined span. The use or method may be characterized in that the frequency spectrum of the input signal may be spectrally resolved across at least one second frequency range, the at least one second frequency range being selected such that the at least one second frequency range lies, at least in part, in particular in full, within the at least one predetermined span. The use or method may be characterized in that the frequency spectrum of the input signal may be at least resolved in the at least one first frequency range and across the second frequency range and the input signal is considered to be an attack or a signal with which the radio authorization system is unfamiliar if a deviation is observed between the spectrum of the input signal and the at least one predetermined span in the at least one first frequency range and/or if the input signal in the second frequency range does not match to an enabling signal. The use or method according may be characterized in that the spectrum of the received signal may be resolved in a random order across the at least one first frequency range and the at least one second frequency range. The use or method may include the first object being designed to resolve signals in different frequency ranges or channels, in particular within a frequency response of from 1 to 8 MHz and/or in a range of from 0.4 to 6 GHz, characterized in that, in order to decode signals and/or to compare the input signal with the at least one predetermined span, different frequency spans or channels are selected in chronological order for analysis. The use or method may be characterized in that the enabling signal may be repeatedly emitted several times and/or the input signal is received across a plurality of repetitions and the metric of the spectral distribution of the input signal is compared with the at least one predetermined span in at least one of the repetitions.

Furthermore, the object is achieved by a radio authorization system comprising a first transceiver in and/or on a first object and a second transceiver in and/or on a second object, wherein the radio authorization system is designed to transmit a plurality of symbols and/or chips at a first symbol or chip rate from the first to the second transceiver in a manner in which they are encoded in at least one first analog data signal, and to transmit a plurality of symbols and/or chips at a second or at the first symbol or chip rate from the second to the first transceiver in a manner in which they are encoded in at least one second analog data signal, wherein the radio authorization system is designed to acquire and analyze an input signal, in particular a second analog data signal, received at the first transceiver in a radio communication between the first and second transceiver, and is designed to determine a metric of a spectral distribution of the input signal and is designed to compare the metric of the spectral distribution of the input signal determined with at least one predetermined span, wherein the radio authorization system is designed a) the input signal is considered to be an attack and/or a signal with which the radio authorization system is unfamiliar and/or approval is denied if the metric of the spectral distribution determined is outside the at least one predetermined span, and/or b) the input signal is considered to be a signal of the radio authorization system and/or approval is granted if the metric of the spectral distribution is within the at least one predetermined span, wherein the radio authorization system is designed to determine the predetermined span solely on the basis of data predetermined in the radio authorization system and/or signals of the radio authorization system, wherein the second transceiver is designed to emit the at least one enabling signal such that the metric of the spectral distribution of the at least one enabling signal is within the at least one predetermined span, wherein the second transceiver and/or second object is/are designed to determine the at least one enabling signal solely on the basis of data predetermined in the radio authorization system and/or on the basis of signals of the radio authorization system, in particular the at least one first analog signal, wherein the second transceiver and/or the second object is/are designed to send the at least one enabling signal as part of the at least one second analog data signal and to encode information in the enabling signal in a plurality of symbols and/or chips.

Advantageous developments of the invention may include providing an access restriction device, wherein the access restriction device may be designed to grant or deny access, in particular by means of an access restriction means, wherein the access restriction device is designed to deny access if the metric of the spectral distribution of the input signal determined is outside the at least one predetermined span, and/or to grant access if the metric of the spectral distribution is within the at least one predetermined span. The radio authorization system may include that the second transceiver may be designed to send the enabling signal to the first transceiver such that the metric of the spectral distribution of the enabling signal is within the at least one predetermined span. An access restriction system in accordance with the invention may comprise a radio authorization system wherein the access restriction device is designed a) to deny access if the metric of the spectral distribution of the input signal determined is outside the at least one predetermined span, and/or b) to grant access if the metric of the spectral distribution is within the at least one predetermined span.

In order to solve the problem according to the invention, a radio authorization system having at least one first and one second object is designed to bring about an approval by means of at least one enabling signal from the second object to the first object, in particular to enable and/or grant access. In this case, by means of the radio authorization system, a plurality of symbols and/or chips are transmitted at a first symbol or chip rate from the first to the second object in a manner in which they are encoded in at least one first analog data signal. In this case, the first and second object are each formed by a transmitter and/or receiver, in particular a transceiver in each case, therefore being formed by a transmitter or transceiver in a (remote control) key of an automobile and a receiver or transceiver of a radio closing unit of the automobile in a radio access system or radio authorization system, for example. In this connection, bringing about an approval is understood to mean opening, unlocking and/or starting and/or making it possible to open or start the corresponding automobile after the enabling signal has been sent to the automobile by actuating the (remote control) key and the enabling signal has been received at the radio closing unit of the automobile, for example. Other examples of ways of enabling can, for example, be granting access to a radio network or granting access to a function, for example the "dispense coffee" function of a coffee machine. In principle, any manner of granting access to an object, place, region or space and/or a function, which access requires authentication for granting access in order to protect against non-authorized access, is conceivable as the approval.

The enabling signal can, however, also only be part of the release measures required, and therefore another authorization component may be required in order to open the automobile door, for example, this preferably not being the case, however. For example, for this purpose another signal having a different frequency or a different band may also be necessary, this, however, preferably not being the case either. For example, it may also be necessary to carry out methods according to the invention several times, i.e. with a plurality of successive and optionally different releases signals, in order to ultimately open a lock, for example. According to the invention, the enabling signal that is subjected to a spectral observation is advantageously in particular not a multi-tone signal in any case.

Furthermore, an enabling signal may also be part of a signal loop, i.e. of a signal loop that sends a signal, or the signal, back and forth between the first and second object one or several times. Therefore, a first signal containing a first message, for example, can be sent from the first object to the second object and the second object can respond to the first object with a second signal, in particular an enabling signal. In this case, the second signal, in particular the second message transmitted therein, is in particular dependent on the first message from the first signal. The first and/or second message can be encrypted and/or contain a (symbol) code, for example. Therefore, the second object can firstly decrypt the (optionally encrypted) (symbol) code of the first message and can generate a second (symbol) code using the first (symbol) code and send it (optionally encrypted) in the second signal. The process of sending the first signal is preferably triggered by an initializing signal from the second to the first object. In this case, both the first and the second objects should be designed such that each of the objects can be used as a transmitter and receiver.

Furthermore, enabling signals may be encoded and/or encrypted, for example. In particular, the corresponding coding and/or encryption of an input signal is furthermore checked in the radio authorization system for whether this to the coding and/or encryption corresponds to that of an enabling signal and/or whether the content or (symbol) code that can be found within the code and/or encryption of an enabling signal may also be found in the input signal.

Furthermore, enabling signals may not only comprise a corresponding code and/or encryption and/or corresponding content and/or a (symbol) code, but also additionally comprise a spectral distribution and/or spectral width and/or start and/or end frequencies or characteristic point(s) within the spectral distribution of the signal, which meets specific requirements (the corresponding requirements will be explained in more detail later on in the description).

In particular, the at least one enabling signal is and/or will be determined by the radio authorization system solely on the basis of data predetermined in the radio authorization system and/or on the basis of signals of the radio authorization system. The at least one enabling signal is also part of the at least one first analog data signal and information, in particular digital information, in the enabling signal is encoded in a plurality of symbols and/or chips. Therefore, the enabling signal can be generated following an instruction stored on the key and/or can be generated on the basis of a signal that is generated by the radio authorization system and received by the key. In particular, in order to generate the enabling signal, no external information is used that is not based on data predeterminedly stored in the radio authorization system or is generated on the basis of such data by means of the method, the use and/or the radio authorization system. In particular, the enabling signal is not based on signals with which the radio authorization system is unfamiliar and/or is not based on environmental signals.

The possibility of being able to use the concept together with standardized data transmission signals as enabling signals, in particular of known systems, such as 4G, 5G, Bluetooth and/or WLAN, is in particular advantageous, wherein in particular no dual tones and/or continuous waves and/or no signals provided specifically for this method are used. Instead, a possible attack is intended to be identified using the standardized data transmission signals.

In particular, the enabling signals used are those that are also used, in particular simultaneously, for digitally transmitting data, in particular user data, in particular in the form of chips and/or symbols. In particular, the signals from such a transmission system are used for the invention, in particular the signals from a Bluetooth system. In particular, the objects are transceivers of a digital data transmission system, in particular operating using QAM. In particular, the enabling signals are signals that are used, in particular simultaneously, for digitally transmitting data, in particular by transmitting chips and/or symbols, in particular signals from a digital data transmission system, in particular based on QAM, ASK, FSK, GFSK, PSK, QPSK, QAM, APSK and/or OFDM, in particular from a digital chip- and/or symbol-synchronized data transmission system.

The use of an enabling signal with digital signals encoded therein is also advantageous in that the shoulders contained in the enabling signal by means of the information encoded therein can be used together with an additional signal, in particular carrying encoded digital information, to determine a signal round trip time measurement between the first and second object with a high degree of accuracy. This makes it possible to further secure the method, the use, and the system according to the invention. In particular, the method, the use, and/or the system are designed for such a determination and/or includes it. Therefore, a specific signal round trip time can likewise be taken into consideration for an approval decision.

In particular, the enabling signal is a single-channel signal and in particular not a dual-tone signal and/or a signal
  comprising only orthogonal carrier frequencies at any time, and/or
  comprising just one carrier frequency in a frequency band at any time, having such a width and/or the width thereof is selected such that no third-order tones are produced when the enabling signal is amplified, and/or
  comprising just one carrier frequency in a frequency band of at least 0.5 MHz, in particular at least 1 MHz at any time, in particular symmetrically around each tone of the enabling signal, wherein the enabling signal in particular preferably comprises just one carrier frequency and/or exclusively comprises orthogonal carrier frequencies at any time.

There therefore advantageously only exists one tone or one frequency in the enabling signal in each frequency band at any time, in particular in every frequency band that has the same width selected from the above-specified frequency band widths, wherein the frequency bands are arranged in particular symmetrically around each tone or each frequency of the enabling signal, and/or there advantageously only exist orthogonal tones or frequencies in the enabling signal in each frequency band at any time, in particular in every frequency band that has one of the above-specified widths, wherein the frequency bands are arranged in particular symmetrically around each tone or each frequency of the enabling signal.

In particular, a two-tone measurement is not carried out. Instead, the method is based on an attacker, for example in an "early-detect-late-commit" attack, having to temporally compress the signal and therefore an increase in the bandwidth, which is identified by the method, in particular by selecting the enabling signal and/or the frequency bands and/or the widths thereof, in particular as described previously.

Not every input signal received at the first object has to be an enabling signal, it may, for example, also be attack signals from third parties.

As a result, the origin of the input signal received at the first object may be the second object, in particular if the input signal is an enabling signal, or may be different therefrom, for example by an attack on the radio authorization system by a third object that is not associated with the radio authorization system. As a result, an attack can, for example, be understood to mean the attempt of such a third object to affect the radio authorization concept or the communication between the first and second object within such a radio authorization system, for example in order to obtain access, for example to a radio network or automobile, without permission or authorization.

According to the invention, it is necessary to identify such an attack. For this purpose a metric of the spectral distribution of the input signal received at the first object is used to ascertain whether the input signal is a signal, in particular an enabling signal, from the radio authorization system and/or whether the input signal represents a signal with which the radio authorization system is unfamiliar, in particular a signal from a third object that is not associated with the radio authorization system, and/or whether the input signal represents an attack, in particular by a third object that is not associated with the radio authorization system.

In this case, a metric of a spectral distribution can in particular be understood to mean both a metric based on and/or formed by an entire frequency spectrum of a signal or only based on and/or formed by parts of such a frequency spectrum and the spectral width of a frequency spectrum or only parts of such a spectral width or one or more, in particular two, characteristic point(s), such as frequencies having a maximum or minimum amplitude and/or intensity or starting point and/or endpoints of a frequency spectrum, or the distance therebetween.

For the use according to the invention, all or some of the spectral width is more advantageously generally used. For example, when using the Bluetooth standard in the event that the input signal is an enabling signal, the spectral width is in particular the frequency width of an individual channel, whereas, in the event of an attack, the input signal extends across more than one channel. As a result, by means of the spectral widths, a clear distinction can be made between an enabling signal and an attack signal.

The metric of the spectral distribution of the input signal is accordingly used to establish whether the input signal is coming from a second object, thus part of a radio authorization system and therefore the approval is provided in particular by an authorized user, or is coming from a third object and therefore an unauthorized user/an unauthorized object is attempting to gain access. It is necessary to identify such an attack by an unauthorized object and/or an unauthorized user in order to prevent access being approved.

For this purpose, the metric of the spectral distribution is compared with at least one span, in particular at least one predetermined span. The at least one predetermined span is in particular a range of values that the metric of the spectral distribution may assume. The span may therefore be a frequency span, for example. It may also be determined by a maximum value and therefore extend from 0 up to this maximum value. The predetermined span accordingly in particular forms a criterion for distinguishing between an enabling signal and/or a signal with which the radio authorization system is unfamiliar and/or an attack using the metric as a parameter.

In particular, the predetermined span is and/or will be determined by the radio authorization system solely on the basis of data predetermined in the radio authorization system and/or signals of the radio authorization system.

In this case, the predetermined span can differ for different radio authorization systems or is adapted in particular to different radio authorization systems and can accordingly be inherent to each radio authorization system. It can, however, also be predetermined depending on the situation and/or on the basis of historical data so as to determine how it may be derived from such data. In particular, however, it is fixedly predetermined, in particular as an absolute or relative numerical value or predetermined by limits as absolute or relative numerical values. In particular, the spectral distribution of the enabling signal and/or width of the enabling signal and predetermined span are dependent on one another or bear a relation to one another and/or are adapted to one another for different radio authorization systems or define one another. The predetermined span is generally adapted to the enabling signal.

It is preferable to use the spectral width itself as the metric of the spectral distribution such that the predetermined span is then understood to mean a predetermined span of the spectral width. In this case, the spectral width can be determined/measured differently in order to compensate for environmental influences, for example, and/or to allow for a simple determination. Therefore, the distance between two characteristic points of the spectrum of an input signal can be used to determine the spectral width of the input signal, for example. For example, starting points and/or endpoints of the spectral distribution and/or frequencies having a maximum or minimum intensity and/or amplitude can be used as characteristic points for determining the spectral width or the limit thereof.

It is alternatively likewise conceivable to use such characteristic points as the metric of the spectral distribution. In this case, the predetermined span then describes a frequency range, which is in particular spanned and/or limited by corresponding characteristic points, which is selected such that corresponding characteristic points of an enabling signal are within the predetermined span or within the frequency range given by the predetermined span. Alternatively, the provision of the difference between characteristic points can be used to determine the predetermined span in order to obtain a value, in particular an absolute value, for the spectral width. The maximum spectral width of a channel and/or of the characteristic points thereof as specified by the standards, for example in a Bluetooth standard, may be mentioned as an example of a predetermined span.

If the corresponding comparison shows that the metric of the spectral distribution of the input signal received is outside the at least one predetermined span, the input signal is considered to be an attack and/or a signal with which the radio authorization system is unfamiliar.

If the metric of the spectral distribution of the input signal received is within the at least one predetermined span and in particular corresponds to the code and/or encryption and/or the corresponding content and/or (symbol) code of the input signal of that of an enabling signal, the input signal is considered to be a signal, in particular an enabling signal, of the radio authorization system. In particular, approval is subsequently granted. In particular, the content of the signal is only checked if the metric is within the at least one predetermined span.

The second object is designed to emit the at least one enabling signal, wherein the metric of the spectral distribution thereof of the enabling signal is within the at least one predetermined span. The second object and/or the system is/are therefore in particular designed to bring about an approval by sending the enabling signal to the first object.

It is clear that, by means of the use of the invention of the metric of the spectral distribution of the input signal in a radio authorization system, the origin of the input signal can be determined to the extent that a distinction may be made between a second object, the signal from which, in the form of an enabling signal, entitles a user to authorized access, and a third, in particular external, object with which the radio authorization system is unfamiliar, access of which is intended to be prevented and which carries out an "early detect/late commit" attack, for example. In contrast to the prior art, which focuses on making an attack as difficult as possible, corresponding enabling signals can be designed to be quite simple and therefore less complex for this purpose, since the attack is not directly prevented but merely needs to be identified in order to then block it. In particular, "early-detect-late-commit" attacks can be identified extremely efficiently in this way due to the increased spectral width of the (attack) signal. Furthermore, the technical requirements on the design of corresponding radio authorization systems or the components thereof may be reduced, thereby consequently allowing for such radio authorization systems to be constructed in a more resource-efficient manner.

Similarly, the problem according to the invention is achieved by a method in a radio authorization system, in particular as described previously. Explanations relating to the function, advantages and advantageous embodiments of the use of the invention likewise apply in particular to the method of the invention.

In order to carry out the method according to the invention, the radio authorization system comprises at least one first and one second object and is designed to bring about an approval by means of at least one enabling signal from the second to the first object. In this case, by means of the radio authorization system, a plurality of symbols and/or chips are transmitted at a first symbol or chip rate from the first to the second object and/or from the from the second to the first object in a manner in which they are encoded in at least one first analog data signal. The method according to the invention is used to establish whether an input signal represents a signal, in particular an enabling signal, from the radio authorization system and/or whether the input signal represents a signal with which the radio authorization system is unfamiliar, in particular a signal from a third object that is not associated with the radio authorization system, and/or whether the input signal is an attack, in particular by a third object that is not associated with the radio authorization system. For this purpose, a metric of the spectral distribution of the input signal received at the first object is compared with at least one predetermined span and in particular approval is granted and/or denied on the basis thereof. The input signal received is in particular considered to be an attack and/or a signal with which the radio authorization system is unfamiliar if the metric of the spectral distribution is outside the predetermined span, and/or is considered to be a signal from the radio authorization system if the metric of the spectral distribution is within the predetermined span. Furthermore, the second object is designed to emit the at least one enabling signal, wherein the metric of the spectral distribution of said at least one enabling signal is within the predetermined span. Similarly to the use according to the invention, the method according to the invention can be used to determine the origin of the input signal in that a distinction is made between a second object, the signal from which, in the form of an enabling signal, entitles a user to authorized access, and a third, in particular external, object with which the radio authorization system is unfamiliar, whose access is intended to be prevented.

Within the context of a method according to the invention, analogous to a use according to the invention, the at least one enabling signal is and/or will be in particular determined by the radio authorization system solely on the basis of data predetermined in the radio authorization system and/or on the basis of signals of the radio authorization system. The at least one enabling signal is also part of the at least one first analog data signal and information, in particular digital information, is encoded in the enabling signal in a plurality of symbols and/or chips.

Advantageous developments described in the following is valid for both the method according to the invention and the use according to the invention.

The metric of the spectral distribution of the input signal and/or enabling signal can advantageously be the overall width of the spectrum or just part of the spectral width of the spectrum, in particular a sideband. The width of the metric and/or the overall width of the spectrum and/or part of the spectral width of the spectrum can be a shoulder or the width of a shoulder of the input signal and/or enabling signal or can be provided by characteristic points of the spectral distribution of the input signal and/or enabling signal.

Furthermore, the predetermined span advantageously comprises the metric of the spectral distribution of the enabling signal and/or the predetermined span in particular exceeds the metric of the spectral distribution of the enabling signal, in particular the spectral width of the enabling signal, by from 1% to 50%, in particular from 10% to 50%, in particular from 10% to 30%.

The metric is advantageously determined as being a spectral width, the at least one limit of which is determined by the frequency at which, based on the frequency having the maximum amplitude of a signal or based on the carrier frequency of the signal, the amplitude of the spectrum displays and/or has displayed a predetermined drop and/or assumes a predetermined value in relation to the maximum amplitude, in particular the amplitude of the signal has dropped to 50%, in particular 35%, in particular 30%, in particular 20%, in particular 10%, in particular 5%, in particular 2%, in particular 1% or less of the maximum amplitude, wherein the predetermined value can in particular be adapted to the radio authorization system, in particular with regard to the quality of the components used, such as the transmitter and/or receiver, and/or is dependent thereon. In particular, both limits of the width are determined by such a limit. Limits established in this way can also be characteristic points of the spectral distribution. This is in particular a lower limit in relation to the frequency and an upper limit in relation to the frequency and/or characteristic points with respect to a lowest and a highest frequency. The metric is provided in particular by the distance between the limits or characteristic points. This makes it possible to exclude errors as a result of noise effects and therefore makes it possible to efficiently and reliably determine the metric of the spectral distribution.

However, other metrics are in principle also suitable as the metric, for example those that take into consideration the amplitude and/or intensity of the input signal or the distribution thereof across the frequency spectrum of the input signal or the time evolution thereof.

The energy present/irradiated in one or more frequency range(s) can also be used as the metric, for example. This is in particular understood to mean the sum of the (photon) energies of all electromagnetic waves, in particular all radio waves, of a signal in the frequency range(s). In this case, in particular both absolute values for the energy and relative values, in particular with respect to the relation between the energy in a plurality of frequency ranges, in particular predetermined ranges for the absolute and/or relative values, qualify as the predetermined span.

In order to determine the metric and/or to establish whether the metric is within the predetermined span, various advantageous alternatives are in particular suitable:

The frequency spectrum of the input signal is advantageously spectrally resolved across at least one first frequency range and/or the energy thereof is determined within the at least one first frequency range. In this case, the at least one first frequency range is selected such that frequencies in the at least one first frequency range lie outside the predetermined spans, at least in part. In particular, the at least one first frequency range does not overlap with the predetermined spans, in particular being at a distance of at least 5% of the signal bandwidth from the predetermined spans. Furthermore, the frequency spectrum of the input signal is advantageously received and/or decoded across at least one second frequency range. In this case, the at least one second frequency range is selected such that the at least one second frequency range lies, at least in part, in particular in full, within the at least one predetermined span, or represents it. In particular, the second range is used to receive and/or to decode the content of the input signal. A suitable selection of the frequency ranges makes it possible to targetedly exclusively observe and analyze those ranges of the spectral distribution that are required for establishing whether the input signal is a signal, in particular an enabling signal, from the radio authorization system and/or whether the input signal represents a signal with which the radio authorization system is unfamiliar and/or whether the input signal represents an attack, and to receive and/or decode the content of the signal. Subsequently, broadband receivers can therefore be dispensed with, for example.

In particular, the input signal is considered to be an attack or a signal with which the radio authorization system is unfamiliar and/or approval is denied if a deviation is observed in the at least one first frequency range between the with respect to the predetermined span and/or if the input signal in the second frequency range does not match to an enabling signal.

The predetermined metric may therefore be used to define a maximum power in the first frequency range, for example, and a check may be carried out to see whether or not this power is exceeded and it is possible to identify therefrom whether an enabling signal may be present (maximum power not exceeded) or may not be present (maximum power exceeded). Provided that the maximum power is not exceeded, the input signal can be considered to be an enabling signal and/or a signal that is known to the radio authorization system if the input signal in the second frequency range or the content/message thereof corresponds to an enabling signal, it therefore has, for example, a content (e.g. code) that matches a preset content.

The first and/or the second frequency range in particular comprise(s) a width in the region of the signal bandwidth. This is not to be understood to mean the absolute position in the spectrum, but the width of the first/second frequency range, wherein the ranges lie in the GHz range, for example.

In another advantageous development of the use according to the invention or of the method according to the invention, the spectrum of the signal received is a) resolved across the at least one first frequency range and/or the energy thereof is determined within the at least one frequency range, and b) received and/or decoded across at least one second frequency range, in particular in a pseudo-random or random order.

For this purpose, in particular the signal is repeatedly emitted several times (in an unpredictable manner).

Such a procedure makes it possible to implement the invention using even simpler means, whereby a plurality of frequency ranges do not have to be simultaneously observed/analyzed/received.

In particular, step a) is repeated several times in this case.

The (pseudo) random procedure makes it difficult here to adapt an (attack) signal to the method according to the invention and/or the use according to the invention, since a targeted adaptation of the (attack) signal to the frequency range relevant at the time of the observation is efficiently prevented by means of the (pseudo) random sequence with regard to the observation of the individual frequency ranges. It is therefore not possible for a third party, for example, to send individual signals adapted to the first and to the at least one second frequency range at the correct point in time, or to predict which of the adapted signals needs to be sent.

The first object is advantageously designed, in particular only designed, to resolve signals in different frequency ranges or channels, in particular within a frequency response of from 1 to 8 MHz and/or in a range of from 0.4 to 6 GHz. In particular, different frequency spans or channels are particularly advantageously selected in chronological order for analysis in order to decode signals and/or to compare the input signal with the predetermined span.

In another advantageous design, the enabling signal is repeatedly emitted several times by the second object, and/or the input signal is received across a plurality of repetitions and the metric of the spectral distribution of the input signal is compared with the predetermined span in at least one, in particular more, in particular a plurality, of the repetitions with the predetermined span.

Furthermore, the problem according to the invention is likewise achieved by a radio authorization system. Furthermore, advantages and developments according to the invention of the use according to the invention and of the method according to the invention can likewise be transferred to the radio authorization system according to the invention, and vice versa.

The radio authorization system according to the invention for acquiring and analyzing a received input signal in a radio communication is designed to determine a metric of a spectral distribution of the input signal and to compare the metric of the spectral distribution of the input signal determined with a predetermined span, and to identify an attack or to identify the input signal as a signal with which the radio authorization system is unfamiliar and/or to deny approval on the basis of the comparison between the metric of the spectral distribution of the input signal determined and the predetermined span. The input signal is in particular considered to be an attack and/or a signal with which the radio authorization system is unfamiliar and/or approval is denied if the metric of the spectral distribution of the input signal determined is outside the predetermined span. Furthermore, the receiver module is in particular designed to consider the input signal to be an enabling signal and/or a signal that is known to the radio authorization system and/or to grant approval if the metric of the spectral distribution of the input signal determined is within the predetermined span.

The object is therefore achieved in particular by a radio authorization system comprising a first transceiver in and/or on a first object and a second transceiver in and/or on a second object, wherein the radio authorization system is designed to transmit a plurality of symbols and/or chips at a first symbol or chip rate from the first to the second transceiver in a manner in which they are encoded in at least one first analog data signal, and/or to transmit a plurality of symbols and/or chips at a second or at the first symbol or chip rate from the second to the first transceiver in a manner in which they are encoded in at least one second analog data signal. In this case, the radio authorization system is designed to acquire and analyze an input signal, in particular a second analog data signal, received at the first transceiver in a radio communication between the first and second transceiver, and is designed to determine a metric of a spectral distribution of the input signal and is designed to compare the metric of the spectral distribution of the input signal determined with at least one predetermined span, wherein the radio authorization system is designed
  a. the input signal is considered to be an attack and/or a signal with which the radio authorization system is unfamiliar and/or approval is denied if the metric of the spectral distribution of the input signal determined is outside the at least one predetermined span, and/or
  b. the input signal is considered to be a signal from the radio authorization system and/or approval is granted if the metric of the spectral distribution is within the at least one predetermined span.

In this case, the radio authorization system is designed to determine the predetermined span solely on the basis of data predetermined in the radio authorization system and/or signals of the radio authorization system. This can be, for example, a saved code and/or a saved ID. An ID stored in the second object stored object and information received from the first object can, for example, also be collectively used to determine information that is to be encoded in the enabling signal and to correspondingly generate the enabling signal. The second object is advantageously designed to operate in this way.

According to the invention, the second transceiver is designed to generate and/or emit the at least one enabling signal such that the metric of the spectral distribution of the at least one enabling signal is within the at least one predetermined span.

In particular, the second transceiver is designed to determine the at least one enabling signal solely on the basis of data predetermined in the radio authorization system and/or on the basis of signals of the radio authorization system, in particular the at least one first analog signal. Therefore, the enabling signal can be generated according to an instruction stored on the second transceiver and/or the second object, in particular a key, and/or can be generated on the basis of a signal generated by the radio authorization system, in particular from the first transceiver and/or first object and received by the second transceiver and/or second object, in particular a key. In particular, in order to generate the enabling signal, no external information is used that is not based on data predeterminedly stored in the radio authorization system or is generated on the basis of such data by the radio authorization system. In particular, the enabling signal is not based on signals with which the radio authorization system is unfamiliar and/or is not based on environmental signals.

Furthermore, the second transceiver and/or the second object is/are designed to send the at least one enabling signal as part of the at least one second analog data signal and information, in particular digital information, in the enabling signal is to encode in a plurality of symbols and/or chips.

Advantageous embodiments of the method and/or of the use can advantageously be transferred to the system, in particular by correspondingly setting up the system, in particular the first and/or second transceiver.

In particular, the system according to the invention is designed to carry out a method according to the invention.

In particular, the second object is a transceiver. The second object and/or the second transceiver of the method, the device, and/or the system is in particular designed as a key fob. In particular, the system is designed and/or the method according to the invention and/or the use according to the invention is/are carried out such that the enabling signal is sent as a response to the reception of a first data signal at the second object and/or transceiver. In particular, the system is designed and/or the method according to the invention and/or the use according to the invention is/are carried out such that a first data signal is sent from the first object and/or first transceiver if it is established that a person is approaching the first object and/or the first transceiver or a component that is rigidly, but not necessarily stiffly, connected thereto, such as a door, door handle, access restriction means and/or cabinet. In particular, the first object and the second object are two separate objects. In particular, the system is designed and/or the method according to the invention and/or the use according to the invention is/are carried out such that an ID and/or a codeword is encoded in the form of symbols and/or chips in the enabling signal. The codeword is in particular at least also determined on the basis of information, which is obtained from the first object in a radio signal, in particular a first analog data signal, in a manner in which it is encoded in the form of symbols and/or chips. In particular, the second object and/or the second transceiver has/have a corresponding design.

The enabling signal, in particular together with the at least one first analog data signal, is advantageously used for measuring the distance between the first and second object and/or the first and second transceiver and/or the antennae thereof. In particular, the system has a corresponding design.

Similarly, the problem according to the invention is by a radio authorization system comprising an access restriction device, wherein the access restriction device is designed to grant and/or deny access, in particular by means of an access restriction means, wherein the access restriction device is designed to deny access if the input signal is considered to be an attack or a signal with which the radio authorization system is unfamiliar and/or if the metric of the spectral distribution of the input signal determined is outside the predetermined span and/or to grant access if the input signal is considered to be an enabling signal and/or a signal that is known to the radio authorization system and/or if the metric of the spectral distribution of the input signal determined is within the predetermined span.

Furthermore, the radio authorization system according to the invention can be designed for carrying out a method according to the invention or for the use according to the invention. For this purpose, it in particular comprises a control unit, which is designed to correspondingly actuate the radio authorization system according to the invention.

Furthermore, the method according to the invention and/or the use according to the invention can be implemented in particular by means of a radio authorization system according to the invention.

BRIEF DESCRIPTION OF THE SEVERAL VIEWS OF THE DRAWINGS

The following description of schematic FIG. 1, which description and drawing are both given purely by way of example, contributes to a better understanding of the invention, in which:

FIG. 1A shows the analysis of an enabling signal using a narrowband receiver and only shows a single frequency range, FIG. 1B shows the analysis of an attack signal using a broadband receiver and only shows a single but broad frequency range, FIG. 1C shows the analysis of an attack signal using a receiver, the bandwidth of which is smaller than that of the receiver in FIG. 1B but greater than that of the receiver in FIG. 1A, and only shows a single frequency range, FIG. 1D shows the analysis of an attack signal by means of a narrowband receiver while observing a first and a second frequency range, and FIG. 1E shows the analysis of an enabling signal by means of a narrowband receiver while observing a first and a second frequency range.

DETAILED DESCRIPTION

FIG. 1 shows both the difference between input signals, which correspond to an approval or an attack signal, and different embodiments of the use according to the invention and/or of the method according to the invention. While FIG. 1A to 1E each show an enabling signal, FIG. 1B-D each show an attack signal.

In the embodiments in FIG. 1A to E, signal components, the amplitude, intensity and/or energy of which lies beneath a limiting value that is shown in the drawing by a double horizontal line, are not observed. This can ensure that frequencies whose origin is a signal noise in the receiving unit, for example, are not observed either. In this case, the limiting value can be adapted depending on the quality and signal stability of the components used and/or the environment of a radio authorization system.

The dotted vertical lines in FIG. 1A to E represent a predetermined span according to the invention, with which a metric according to the invention of the spectral distribution of an input signal is compared.

FIG. 1A shows an enabling signal as an input signal. It is immediately clear that the entire frequency spectrum, with the exception of frequencies below the limiting value, lies within the predetermined span. In FIG. 1A, the spectral distribution of the input signal is only observed across an individual narrowband frequency range that is characterized by a curly bracket below the spectrum. This frequency range is a second frequency range according to the invention. This second frequency range can be used to receive and decode the content of the signal. Since only a single narrowband frequency range is looked at and this is arranged symmetrically around the carrier frequency, the procedure shown in FIG. 1A is not suitable for the differentiation according to the invention between an enabling signal and an attack signal and does not contain all the features of the invention.

FIG. 1B shows an embodiment in which the spectral distribution of the input signal is resolved across a large frequency range, i.e. for example by a broadband receiver, which exceeds the predetermined span on both sides and/or on both shoulders of the spectral distribution of the input signal (see curly brackets). This embodiment is suitable for the differentiation according to the invention between an enabling signal and an attack signal. It becomes clear that, in the predetermined span in which an enabling signal would be expected, a frequency spectrum can be observed that only slightly differs from that of an enabling signal. Subsequently, this signal could incorrectly be interpreted as an enabling signal if only a narrowband frequency range within the predetermined span were to be observed between the dotted lines by analogy with FIG. 1A. However, by means of the broadband resolution of the frequency spectrum of the input signal, signal frequencies outside the predetermined span are also clearly detected. The metric of the spectral distribution (the maximum spread thereof when observing the spectral width as the spectral distribution is characterized by dashed vertical lines) established considerably exceeds the predetermined span. In the region outside the predetermined span, the input signal consequently does not correspond to a signal and/or enabling signal (see FIG. 1A), since signals and/or enabling signals that are known to the radio authorization system exclusively lie within the predetermined span. The input signal is subsequently considered to be an attack signal and access is denied.

FIG. 1C shows another advantageous embodiment of the use according to the invention and/or of the method according to the invention. Compared with FIG. 1B, the frequency spectrum is only observed across a frequency range that contains the predetermined span and also extends toward only one shoulder of the spectrum. As a result, there are fewer requirements observing the receiver, and therefore a receiver having a smaller bandwidth can be used. Similarly to FIG. 1B, it becomes clear that, although the input signal resembles an enabling signal within the predetermined span, it displays a significant spectral distribution in the region outside the predetermined span. The metric of the spectral distribution (the maximum spread thereof when observing the spectral width as a spectral distribution is characterized by dashed vertical lines) established considerably exceeds the predetermined span. In comparison with FIG. 1B, it should be noted that only part of the spectral distribution of the input signal is observed in FIG. 1C due to the frequency range observed, which has a narrower band. As a result, the metric established only corresponds to part of the spectral width of the input signal, for example, and not to the entire spectral width, as in FIG. 1B. Nevertheless, the metric established considerably exceeds the predetermined span. In this respect, the signal is subsequently considered to be an attack signal and access is denied.

FIGS. 1D and 1E show a particularly advantageous embodiment of the use according to the invention and/or of the method according to the invention. The spectral distribution of the input signal is now not only observed across one, but two separate, frequency ranges. In this case, both frequency ranges are narrow such that narrowband and therefore inexpensive receivers can be used. It is also possible to observe these ranges one after the other using just one receiver. The left-hand frequency range in the drawing corresponds to a second frequency range according to the invention, while the right-hand frequency range constitutes a first frequency range according to the invention. The second frequency range lies entirely inside the predetermined span in FIGS. 1D and 1E. In the second frequency range, the coding, content and/or encryption are checked in particular as a matter of priority in order to establish whether the input signal can be an enabling signal. In contrast, the first frequency range is predominantly used to determine the metric of the spectral distribution. In this respect, in particular the width of the spectral distribution is analyzed in this first frequency range. If a significant frequency spectrum and/or frequencies having a significant amplitude, intensity, and/or energy is/are observed within this range, the input signal is considered to be an attack and access and/or release is/are denied despite potentially having the correct content, correct coding, and/or encryption.

If FIGS. 1D and 1E are compared with one another, considerable differences will be clear between an attack signal (FIG. 1D) and an enabling signal (FIG. 1E).

In the case of the enabling signal in FIG. 1E, the spectral distribution of the input signal in the first frequency range does not have any, or any significant, amplitude, intensity and/or energy. The metric of the spectral distribution determined in said drawing is 0, unlike in FIG. 1D, in which the metric of the spectral distribution is greater than 0. Alternatively, the metric of the spectral distribution can also be determined by means of the first and second frequency range. The metric of the spectral distribution can then be subsequently determined in FIG. 1E in that it corresponds to the second frequency range, in which significant amplitudes, intensities, and/or energies are found (a signal is present across the entire span of the second frequency range that is analyzed). As a result, the metric lies within the predetermined span. If, in addition, a check performed for the encryption and/or coding in the second frequency range is positive, the input signal is identified as being an enabling signal and approval and/or access is granted. In comparison therewith, the spectral distribution in FIG. 1D, which represents that of an attack signal, shows signals having a significant amplitude, intensity, and/or energy in the first frequency range. The metric of the distribution determined here will be greater than 0. Alternatively, the metric can also be determined by the lower limit, in particular the lowest frequency (acquiring of which is limited by the lowest frequency of the frequency ranges) and the upper limit, in particular the greatest frequency (acquiring of which is limited by the highest frequency of the frequency ranges). In the example shown, the metric established would then accordingly be limited by the lowest frequency of the second frequency range and the highest frequency of the first frequency range, this is shown by dashed lines. It can be seen that the metric also established for this observation lies outside the predetermined span, as a result of which the input signal, in particular despite potentially having the correct content, correct coding and/or encryption, is identified as an attack signal and approval and/or access is not granted.

Furthermore, a plurality of first frequency ranges can also be observed, wherein these are in particular advantageously selected on the basis of the predetermined span such that the frequencies of at least one first frequency range contain frequencies that are lower than those inside the predetermined span and the frequencies of at least one other first frequency range contain frequencies that are greater than those inside the predetermined span, also in particular do not overlap with the frequencies within the predetermined span. The first frequency range(s) can be flexibly selected and/or changed or modified between authentication processes or within a loop of an authentication process. Furthermore, first and second frequency ranges do not have to be observed simultaneously.

The invention claimed is:

1. A use in a radio authorization system comprising one first object and one second object:
   wherein a plurality of symbols or chips encoded in at least one first analog data signal are transmitted at a first symbol or chip rate from the first object to the second object or from the second object to the first object by means of the radio authorization system;
   wherein the radio authorization system is designed to bring about an approval by means of at least one enabling signal from the second object to the first object;
   wherein a metric of a spectral distribution of an input signal received at the first object is compared with at least one predetermined span;
   wherein the predetermined span is or will be determined by the radio authorization system solely on a basis of data predetermined in the radio authorization system or on signals of the radio authorization system; and
   a. the input signal received is considered to be an attack or a signal with which the radio authorization system is unfamiliar or approval is denied if the metric of the spectral distribution is outside the at least one predetermined span; or
   b. is considered to be a signal of the radio authorization system or approval is brought about if the metric of the spectral distribution is within the at least one predetermined span;
   wherein the second object is designed to emit the at least one enabling signal, wherein the metric of the spectral distribution of the at least one enabling signal is within the at least one predetermined span;
   wherein the at least one enabling signal is or will be determined by means of the radio authorization system solely on the basis of data predetermined in the radio authorization system or on the basis of signals of the radio authorization system;
   wherein the at least one enabling signal is part of the at least one first analog data signal and information is encoded in the at least one enabling signal in the plurality of symbols or chips.

2. A method in a radio authorization system comprising one first object and one second object:
   wherein a plurality of symbols or chips encoded in at least one first analog data signal are transmitted at a first symbol or chip rate from the first object to the second object or from the second object to the first object by means of the radio authorization system in;
   wherein the radio authorization system is designed to bring about an approval by means of at least one enabling signal from the second object to the first object;
   wherein a metric of a spectral distribution of the input signal received at the first object is compared with at least one predetermined span;

wherein the predetermined span is or will be determined by the radio authorization system solely on a basis of data predetermined in the radio authorization system or on signals of the radio authorization system; and a. the input signal received is considered to be an attack or a signal with which the radio authorization system is unfamiliar or approval is denied if the metric of the spectral distribution is outside the at least one predetermined span; or b. is considered to be a signal of the radio authorization system or an approval is brought about if the metric of the spectral distribution is within the at least one predetermined span;

wherein the second object is designed to emit the at least one enabling signal, wherein the metric of the spectral distribution of the at least one enabling signal is within the at least one predetermined span;

wherein the at least one enabling signal is or will be determined by means of the radio authorization system solely on the basis of data predetermined in the radio authorization system or on the basis of signals of the radio authorization system;

wherein the at least one enabling signal is part of the at least one first analog data signal and information is encoded in the enabling signal in the plurality of symbols or chips.

3. The method according to claim 1, wherein the metric of the spectral distribution of the input signal or the at least one enabling signal:

is an overall width of the spectrum; or is/are only part of a spectral width of the spectrum of the input signal or the at least one enabling signal; or is/are provided by endpoints of the spectral distribution of the input signal or the at least one enabling signal.

4. The method according to claim 1, wherein the at least one predetermined span comprises the metric of the spectral distribution of the at least one enabling signal, or the at least one predetermined span exceeds the metric of the spectral distribution of the at least one enabling signal a spectral width of the at least one enabling signal by from 1% to 50%, or wherein the at least one predetermined span is exactly one predetermined span.

5. The method according to claim 1, wherein the metric is determined in that the metric is a spectral width, at least one limit of which is determined by a frequency at which, based on the frequency having a maximum amplitude of a signal or the carrier frequency, an amplitude of the spectrum of the signal has dropped to 5% or less of the maximum amplitude.

6. The method according to claim 1, wherein a frequency spectrum of the input signal is spectrally resolved across at least one first frequency range, the at least one first frequency range being selected such that frequencies in the at least one first frequency range lie outside the at least one predetermined span, at least in part.

7. The method according to claim 6, wherein the frequency spectrum of the input signal is spectrally resolved across at least one second frequency range, the at least one second frequency range being selected such that the at least one second frequency range lies, at least in part, within the at least one predetermined span.

8. The method according to claim 7, wherein the frequency spectrum of the input signal is at least resolved in the at least one first frequency range and across the second frequency range and the input signal is considered to be an attack or a signal with which the radio authorization system is unfamiliar if a deviation is observed between the spectrum of the input signal and the at least one predetermined span in the at least one first frequency range or if the input signal in the second frequency range does not match to an enabling signal of the at least one enabling signal.

9. The method according to claim 7, wherein the spectrum of a received signal is resolved in a random order across the at least one first frequency range and the at least one second frequency range.

10. The method according to claim 1, wherein the first object is designed to resolve signals in different frequency ranges or channels, wherein, in order to decode signals or to compare the input signal with the at least one predetermined span, different frequency spans or channels are selected in chronological order for analysis.

11. The method according to claim 1, wherein the at least one enabling signal is repeatedly emitted several times or the input signal is received across a plurality of repetitions and the metric of the spectral distribution of the input signal is compared with the at least one predetermined span in at least one of the repetitions.

12. A radio authorization system, comprising a first transceiver in or on a first object and a second transceiver in or on a second object, wherein the radio authorization system is designed to transmit a plurality of symbols or chips at a first symbol or chip rate encoded in at least one first analog data signal from the first transceiver to the second transceiver, and to transmit a plurality of symbols or chips encoded in at least one second analog data signal at a second symbol or chip rate or at the first symbol or chip rate from the second transceiver to the first transceiver;

wherein the radio authorization system is designed to acquire and analyze an input signal received at the first transceiver in a radio communication between the first transceiver and the second transceiver, and is designed to determine a metric of a spectral distribution of the input signal and is designed to compare the metric of the spectral distribution of the input signal determined with at least one predetermined span, wherein the radio authorization system is designed such that:

a. the input signal is considered to be an attack or a signal with which the radio authorization system is unfamiliar or approval is denied if the metric of the spectral distribution determined is outside the at least one predetermined span; or b. the input signal is considered to be a signal of the radio authorization system or approval is granted if the metric of the spectral distribution is within the at least one predetermined span;

wherein the radio authorization system is designed to determine the predetermined span solely on a basis of data predetermined in the radio authorization system or signals of the radio authorization system;

wherein the second transceiver is designed to emit at least one enabling signal such that the metric of the spectral distribution of the at least one enabling signal is within the at least one predetermined span;

wherein the second transceiver or the second object is/are designed to determine the at least one enabling signal solely on the basis of data predetermined in the radio authorization system or on the basis of signals of the radio authorization system;

wherein the second transceiver or the second object is/are designed to send the at least one enabling signal as part of the at least one second analog data signal and to encode information in the at least one enabling signal in a plurality of symbols or chips.

13. The radio authorization system according to claim 12, comprising an access restriction device, wherein the access restriction device is designed to grant or deny access, wherein the access restriction device is designed to deny access if the metric of the spectral distribution of the input signal determined is outside the at least one predetermined span, or to grant access if the metric of the spectral distribution is within the at least one predetermined span.

14. The radio authorization system according to claim 12, wherein the second transceiver is designed to send the at least one enabling signal to the first transceiver such that the metric of the spectral distribution of the at least one enabling signal is within the at least one predetermined span.

15. An access restriction system comprising a radio authorization system according to claim 13, wherein the access restriction device is designed:
   a. to deny access if the metric of the spectral distribution of the input signal determined is outside the at least one predetermined span; or
   b. to grant access if the metric of the spectral distribution is within the at least one predetermined span.

\* \* \* \* \*